United States Patent [19]

Stangeland

[11] Patent Number: 5,112,146
[45] Date of Patent: May 12, 1992

[54] FUNCTIONALLY GRADATED ROLLING ELEMENT BEARING RACES

[75] Inventor: Maynard L. Stangeland, Thousand Oaks, Calif.

[73] Assignee: Rockwell International Corporation, Seal Beach, Calif.

[21] Appl. No.: 731,697

[22] Filed: Jul. 17, 1991

[51] Int. Cl.⁵ .............................................. F16C 33/62
[52] U.S. Cl. ............................ 384/492; 384/569; 384/907.1
[58] Field of Search ............... 384/492, 493, 513, 548, 384/557, 569, 625, 907, 907.1

[56] References Cited

U.S. PATENT DOCUMENTS

| | | | |
|---|---|---|---|
| 3,782,794 | 1/1974 | Chmura et al. | 384/492 |
| 4,293,171 | 10/1981 | Kakumoto et al. | 384/492 |
| 4,362,344 | 12/1982 | Lederman | 384/482 |

FOREIGN PATENT DOCUMENTS 167021 10/1983 Japan ................................ 384/492

Primary Examiner—Thomas R. Hannon
Attorney, Agent, or Firm—H. Fredrick Hamann; Harry B. Field; David C. Faulkner

[57] ABSTRACT

A bearing assembly including an inner race element and an outer race element each having raceways therein, the gradated race matrixes making up the composition of the race elements such that each race element transitions from a metallic substrate such as steel to an outer wear resistant layer such as silicon nitride.

3 Claims, 2 Drawing Sheets

FUNCTIONALLY GRADED ROLLING ELEMENT BEARING RACES

BACKGROUND OF THE INVENTION

1. Field of the Invention

The invention relates to improved race elements in a rolling element bearing assembly. It is particularly directed to an improvement in the composition of the race elements accomplished by functionally gradating the race material composition to optimize corrosion resistance, thermal expansion, hardness of the raceway, and minimum friction at the rolling element to raceway interface.

2. Related Art

Most prior art is for rolling element bearings operating in oil or a liquid that provides lubrication as well as cooling. For dry operation or for machinery where the rolling element bearing must operate in a fluid with low viscous properties such as cryogenic propellants, conventional bearing materials cannot be utilized. Corrosion resistant materials, such as martensitic stainless steel, are presently used for the races and Teflon (Trademark of E. I. duPont de Nemours & Co., Inc.) filled fiberglass or silver are used for the dry lubricating cage or separator.

Recent improvements in rolling element bearings have included silicon nitride balls or rollers which are much harder and more wear resistant than martensitic stainless steel. When silicon nitride balls or rollers are operated with martensitic stainless steel races, the raceways are the first to wear and spall. In addition, the martensitic race material thermal coefficient of expansion is less than that of the typical shaft and housing materials. The inner race must, therefore, be installed on the shaft with an interference fit at room temperature in order to remain piloted at the cryogenic operating temperature. This results in high hoop stresses in the martensitic stainless steel inner race which is susceptible to stress corrosion when in the presence of moisture, resulting in inner race cracking. Conversely, the outer race must be installed in the housing with a larger than desirable clearance to compensate for the difference in thermal contraction.

Various bearing assembly configurations each provided with lubrication means are disclosed such as for example in the following documents incorporated by reference.

U.S. Pat. No. 4,362,344 of Dec. 7, 1982, provides a bearing with stamped, or ground, inner and outer races in which the gap between the races is filled with a separate rubber sealing ring. In addition a full complement of bearing elements along with the desired type and amount of lubricant is assembled between curvilinear raceways for controlling bearing assembly motion.

U.S. Pat. No. 4,293,171 of Oct. 6, 1981 describes an anti-friction bearing wherein the rolling elements are coated with an intermediate metal layer such as by ion plating, said metal layer having lubricating properties.

However, it is heretofore unknown to provide, in a bearing assembly, race elements which are functionally gradated to provide corrosion resistance, desired thermal expansion, hard raceway wear surface properties, and minimum friction.

SUMMARY AND OBJECTIVES OF INVENTION

Accordingly, it is an object of the invention to provide an improved bearing assembly.

A further object of the present invention is to provide a bearing assembly having improved longevity, wear resistance, and a coefficient of expansion matched to that of the shaft and housing which contain the rolling element bearing.

Another advantage resides in functionally gradate material of inner and outer races so:

Bulk of race can be made of a corrosion resistant high strength steel that is thermally compatible with the shaft and housing materials and is not susceptible to stress corrosion cracking.

Raceway surfaces can be made of a material that is hard and resistant to wear and spalling (silicon nitride, ceramics, diamond, etc.) and potentially has a low coefficient of friction.

Other advantages and objects of the present invention can be found in the bearing assembly described herein which provides for the fabrication of bearing inner and outer races where the composition of the race can be gradated from very hard low friction material at the rolling element interface to a corrosion resistant base material that is thermally compatible with the shaft or housing.

DESCRIPTION OF THE PREFERRED EMBODIMENT

Figure 1:
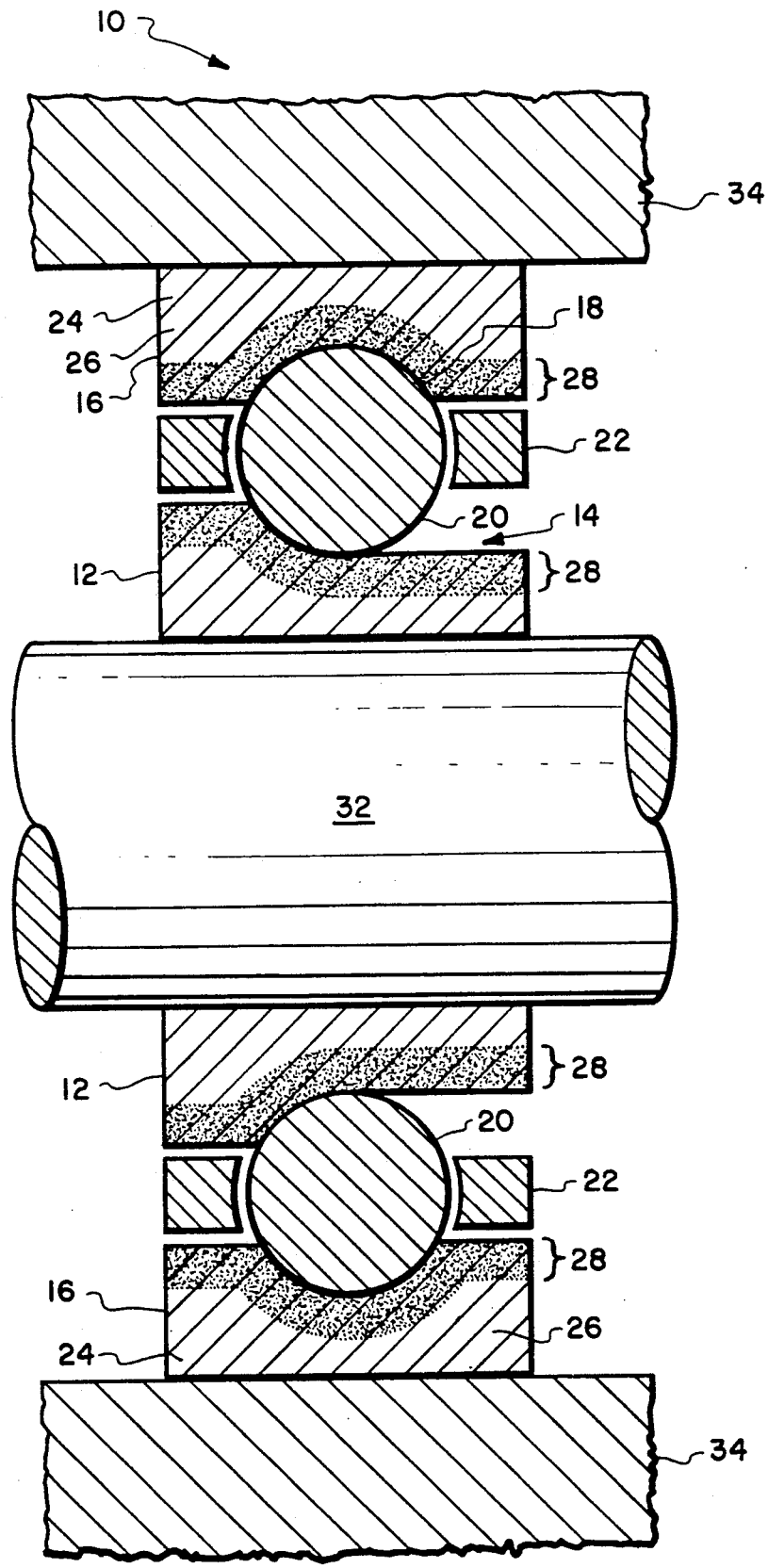
FIG. 1 is a view in vertical sections showing the inner and outer race elements of a ball bearing assembly according to the invention.
Figure 2:
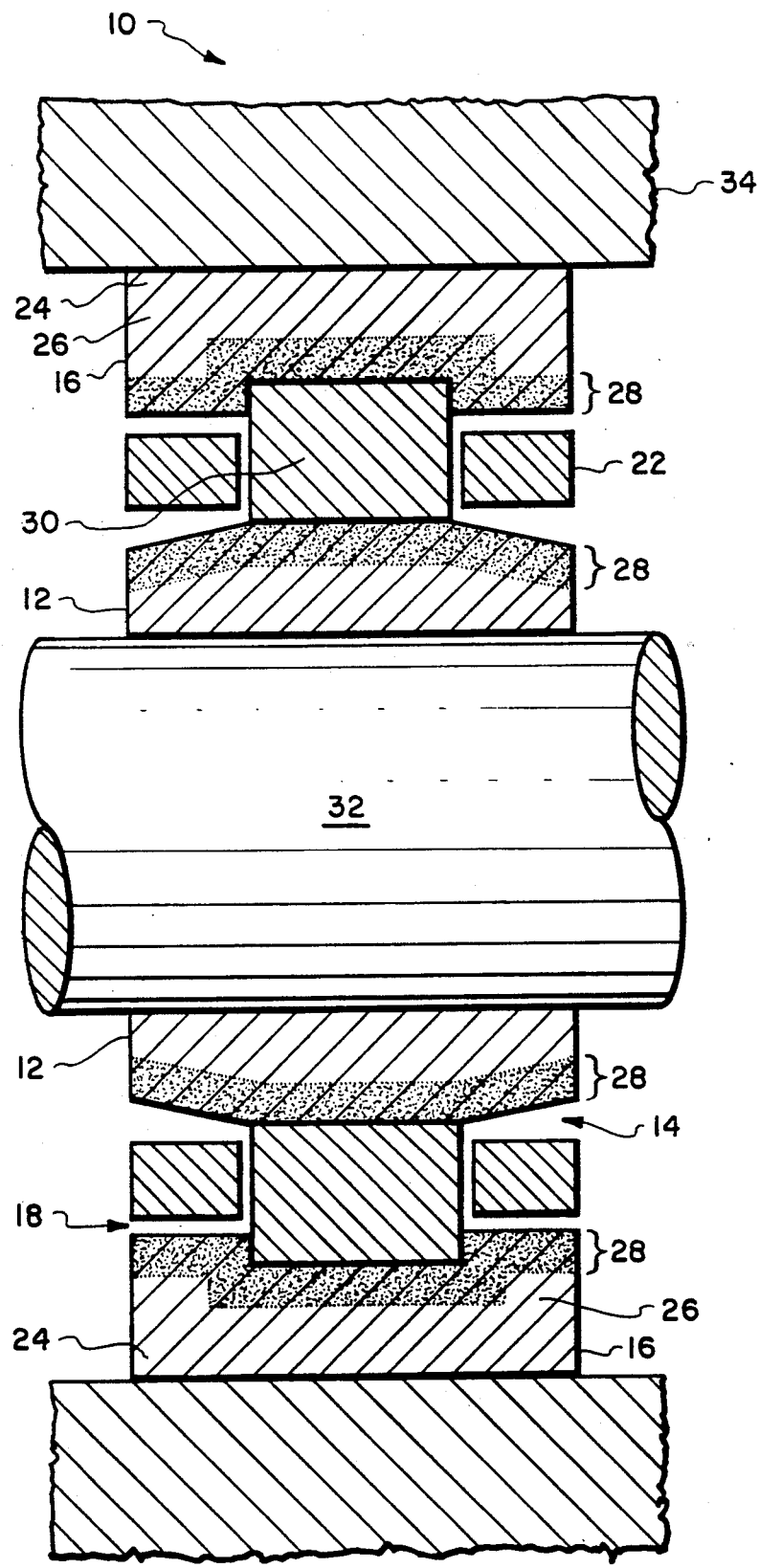
FIG. 2 is a view of a bearing assembly of the present invention in which a roller element is juxtapositioned intermediate the inner and outer race elements.

FIGS. 1 and 2 show the most preferred embodiments of the bearing assembly 10. As depicted, an inner race element 12 having a raceway 14 therein as well as an outer race element 16 having a complementary raceway 18 compliments shaft 32 and housing 34.

Bearing ball elements 20 carried in said raceways 14, 18 and being moveable relative thereto is provided in the bearing assembly 10. A cage or separator 22 maintains equal positioning of bearing balls 20 during rotation. Each race element 12 and 16 is configured to have a corrosion resistant metallic sub-matrix layer 24 which may be formed of a high strength corrosion resistant steel. An intermediate matrix layer 26 which is a mixture of the sublayer and the outer layer and having a hardness intermediate the metallic sub-matrix and an outer layer 28 of very hard low friction material is provided. The outer layer 28, the surface of which contacts bearing 20, may be made of a very hard low friction material such as silicon nitride, diamond, or diamond-like materials.

FIG. 2 depicts a bearing assembly in accordance with the present invention wherein bearing rollers 30 are provided instead of bearing balls 20. Otherwise the bearing assembly conforms in design and function to that of the embodiment of FIG. 1.

In operation a bearing assembly according to the present invention would provide bearings that have low friction, high hertzian stress capacity, corrosion resistant, and are thermally compatible with the surrounding components in applications such as in cryogenic turbopumps, and the like.

What is claimed is:
1. In a bearing assembly including:
    (a) an inner race element having a raceway therein;
    (b) an outer race element having a raceway therein;
    (c) a bearing element carried in said raceway and being movable relative thereto, the improvement therein being gradated race elements comprising:
        (i) a corrosion resistant metallic sub-matrix layer; and
        (ii) an intermediate metallic matrix layer having a hardness intermediate the metallic sub-matrix and an outer layer of very hard low friction material the surface of which contacts the bearing element.

2. The bearing assembly of claim 1 in which the metallic sub-matrix layer is a high strength corrosion resistant steel.

3. The bearing assembly of claim 1 in which the outer layer comprises a composition selected from silicon nitride or diamond-like materials.

* * * * *